INVENTOR.
FORREST S. WILLIAMS
ROBERT L. ABBOTT
BY

ATTORNEY

United States Patent Office 3,528,165
Patented Sept. 15, 1970

3,528,165
CORROSION INHIBITING PROCESS
Forrest S. Williams, Springfield, Pa., and Robert L. Abbott, Medford Lakes, N.J., assignors to the United States of America as represented by the Secretary of the Navy
Filed Apr. 24, 1967, Ser. No. 634,057
Int. Cl. B23k *21/00*
U.S. Cl. 29—470.1      1 Claim

ABSTRACT OF THE DISCLOSURE

Subject invention relates to an improved process for inhibiting corrosion at and around fastening devices that are used to join two or more load carrying structural elements one to the other. The improved method involves the use of a metallic patch or strip ultrasonically welded over the exposed extremities of the fastening devices to provide a hermetic seal from the external environment.

---

Many techniques and procedures have been used in the the past to inhibit or control corrosion of aircraft structural members which are secured one to the other by conventional fastening devices. Such procedures often involve the application of suitable corrosion inhibiting primer compositions on and about the fastening device and the fastener apertures in the structural members. After installation of the fastener, the primer composition and/or other conventional top coat compositions or paints are often applied to the external surfaces of the fastener and the associated structural members. The surfaces of the fastener and the structural members are also often chemically pre-treated in various ways to improve adhesion of the primer and paint compositions on the various surfaces. Stresses and strains in the structural members and the fastening device produced by their slight relative movements under load, however, have been found to cause cracking and chipping of the primer and paint coatings particularly at and around the interface of the fastener and the adjoining structural members. Cracking and chipping of this kind occurs most readily in low temperature environments when the primer and paint coatings are relatively brittle. Once the coating is cracked, water containing chlorides from the sea, sulfur compounds from stack gases and other corrosive agents penetrate the protective surface and corrosion of the fastening device and the structure members begins. Ultimate resulting corrosion is often so severe that upper surfaces of stabilizers, wings and other aircraft structural elements must be replaced periodically.

It is therefore a principal object of the present invention to provide a novel and improved method of minimizing corrosion at and around fastening devices used to join two or more structural members one to the other.

It is a further object of the invention to provide a novel and improved method of minimizing corrosion at and around an aircraft structure fastening device even where relative movement between joined aircraft structure members occurs.

It is a further object of the invention to provide a novel and improved method of providing an ultrasonic hermetic seal over aircraft structure member fasteners.

Other objects and many of the attendant advantages of this invention will be readily appreciated as the same becomes better understood by reference to the following detailed description when considered in connection with the accompanying drawing wherein.

Figure 2:
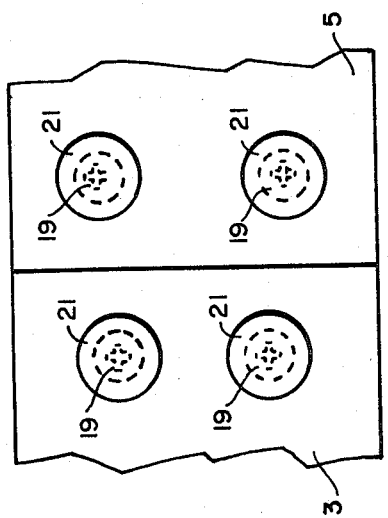
FIG. 2 is a top view of the embodiment of the invention shown in FIG. 1.
Figure 1:
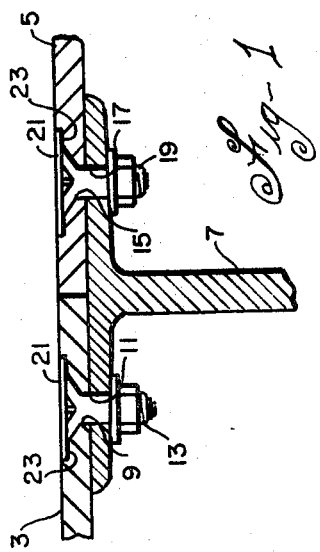
FIG. 1 is a cross-sectional view of a preferred embodiment of the invention in which a pair of adjoining aircraft structural members are secured to a common support by means of conventional bolt and nut fastening devices.

Referring now to FIGS. 1 and 2 of the drawing, it will be noted that the abutting plate members 3 and 5 of the aircraft or other structure are secured to opposite sides of the flanged extremity of the I-beam or support member 7. The apertures 9 through the plate member 3 are disposed in alignment with similarly dimensioned apertures 11 through one flanged extremity of the support member 7 to receive the conventional bolt and nut assembly or other suitable fastening device 13. Similarly, apertures 15 through plate member 5 are disposed in alignment with the apertures 17 through the other flanged extremity of the support member 7 to receive the bolt and nut assembly or other conventional fastening device 19. Apertures 9 and 15 are preferably countersunk as shown to accommodate the heads of their associated bolts and afford a continuous flush upper surface of structural plate members 3 and 5. Prior to the assembly of the plate members or the like 3 and 5 on support member 7, the peripheral surfaces of the apertures 9, 11, 15 and 17 through the plate members 3 and 5 and the support member 7 as well as bolt and nut assemblies 13 and 19 are preferably coated with a conventional corrosion inhibiting primer or paint composition. The plate members 3 and 5 are then positioned on the support member 7 and secured thereto by the bolt and nut assembly or the like 13 and 19. Metallic patches 21 are then positioned over the upper extremity of the bolt and nut assemblies 13 and 19 and are ultrasonically welded to the upper surfaces of plate members 3 and 5. The metal from which the patches 21 are fabricated is selected such that it is compatible with the metal of plate members 3 and 5 for the ultrasonic weld. Thus inasmuch as various aluminum alloy materials are generally used in the fabrication and construction of aircraft structural members, the material from which the patches 21 is made will also generally be a similar aluminum alloy. Plate members 3 and 5 are preferably recessed as at 23 so as to provide the desired continuous flush external surface of the aircraft surface. The ultrasonic weld provides an effective hermetic seal over the top of the bolt and nut assemblies 13 and 19 without the application of excessive heat which often produces substantial adverse effects on the strength, hardness, temper and other characteristics of the plate members 3 and 5, the support member 7 or the bolt and nut assemblies 13 and 19.

Figure 3:
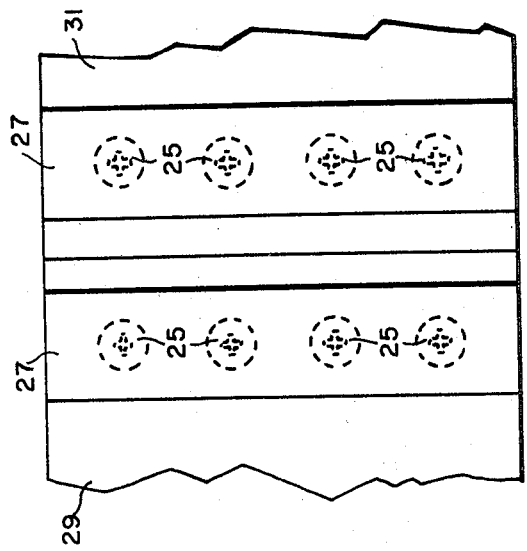
FIG. 3 is a top view which illustrates another preferred embodiment of the invention.

Another embodiment of the invention is illustrated in FIG. 3 of the drawing. As shown therein, a plurality of fastening devices 25 are positioned in extended linear alignment. Where this occurs, as is frequently the case in the fabrication of aircraft structures, elongated strips 27 rather than individual patches are ultrasonically welded in the recesses in plate members 29 and 31 to provide the desired hermetic seal over the bolt and nut assemblies 25.

In operation, the above described anti-corrosion techniques were found to be highly effective. Moisture containing chlorides, sulfur compounds and other corrosive agents failed to penetrate the ultrasonic seals of the patches and strips 21 and 27. Even where the plate members were placed under continuous stress and strain, no cracking or chipping of the corrosion inhibitive coatings occurred. As a result, no corrosion of the plate members, the support members or the bolt and nut assemblies could be detected even after prolonged exposure to severe corrosive environments.

Although the above described improved anti-corrosion process of the invention is generally described herein in connection with the protection of bolt and nut fastening devices used on naval aircraft structures which are often subjected to extreme corrosive environments, it is to be understood that the improved method could be used to protect any suitable fastening device on any suitable structure without departing from the spirit or scope of the invention.

It is also to be understood that, although the invention is described hereinabove in connection with minimizing the corrosion of the exterior extremity of a fastening device, its inner extremity could be similarly hermetically sealed from its environment by ultrasonically welding a protective enclosure or cap thereover without departing from the spirit or scope of the invention.

What is claimed is:

1. In an aircraft structure in which component members thereof are secured one to another by a fastening device that passes through aligned apertures in said members, a method of minimizing corrosion of the fastening device and adjacent portions of the structural members, said method comprising:
   (a) recessing an exterior surface of at least one of the structural members about the aperture therethrough;
   (b) positioning a metallic patch in the recessed surface so that said patch completely covers the fastening device;
   (c) and ultrasonically welding the patch in the recessed surface to the contiguous surface of the adjacent structural member so as to provide a finished flush exterior surface.

References Cited

UNITED STATES PATENTS

| | | | |
|---|---|---|---|
| 807,656 | 12/1905 | Buchanan | 29—483 XR |
| 1,916,989 | 7/1933 | Rader | 29—483 XR |
| 2,111,557 | 3/1938 | Draim | 244—132 |
| 2,167,686 | 8/1939 | Schmidt | 244—132 |
| 3,219,748 | 10/1965 | Miller | 29—470.1 XR |
| 3,357,620 | 12/1967 | Bratschi | 29—470.1 XR |

OTHER REFERENCES

Alcoa Structural Handbook (especially page 30) published 1958 by Alcoa.

JOHN F. CAMPBELL, Primary Examiner

R. B. LAZARUS, Assistant Examiner

U.S. Cl. X.R.

29—475, 483; 244—119, 123, 131